United States Patent Office 2,990,412
Patented June 27, 1961

2,990,412
ISOCYANOGEN TETRAAZIDE AND ITS PREPARATION
Christoph J. Grundmann, Lancaster, Pa., and Wilhelm Joseph Schnabel, Columbus, Ohio, assignors to Olin Mathieson Chemical Corporation, a corporation of Virginia
No Drawing. Filed Apr. 14, 1959, Ser. No. 806,210
3 Claims. (Cl. 260—349)

This invention relates to a new chemical compound, isocyanogen tetraazide, and to a method for its preparation.

Isocyanogen tetraazide has the structural formula

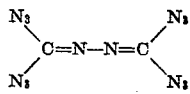

It is a crystalline colorless solid which melts at 89° C. without decomposition. Small amounts of isocyanogen tetraazide slowly heated will volatilize undecomposed around 150° C. On sudden heating or upon a stroke the compound will explode with extreme violence. It is soluble in the common organic solvents such as acetone, the alcohols, the ethers, aliphatic and aromatic hydrocarbons, and the chlorinated hydrocarbons. It contains 89.1% nitrogen by weight.

Isocyanogen tetraazide is prepared, according to this invention, by reacting isocyanogen tetrabromide with an alkali metal azide under surprisingly mild conditions. The reaction proceeds generally according to the following equation:

$Br_2C=N-N=CBr_2 + 4MeN_3$
$\rightarrow (N_3)_2C=N-N=C(N_3)_2 + 4MeBr$ wherein Me is an alkali metal such as sodium, lithium or potassium. The reaction can be carried out at a temperature within the range of about 0° to 50° C. Advantageously the reaction is carried out while the isocyanogen tetrabromide is dissolved in a small amount of an organic solvent miscible with water, such as methanol, ethanol, isopropanol, glycerol, acetone or the like, and the alkali metal azide is dissolved in a small amount of water. The reaction is usually complete within an hour or so and the isocyanogen tetraazide can be precipitated from the reaction mixture by the addition of water. Isocyanogen tetrabromide can be prepared by the method described by J. Thiele in Annalen der Chemie, Justus Liebigs, vol. 303, pages 57–70 (1898).

The preparation of isocyanogen tetraazide is illustrated in detail by the following examples:

*Example I*

0.1 g. of isocyanogen tetrabromide (purified by steam distillation and sublimation and used immediately after preparation) was dissolved in 1.0 ml. of acetone and cooled at 0° C. A solution of 0.09 g. (about 30% excess) sodium azide (activated by rubbing with a trace of $N_2H_4 \cdot H_2O$ and precipitated from a little water with acetone as described by J. Nelles, Ber. dtsch. Chem. Ges., 65, 1946 [1932]) in 0.6 ml. of water, cooled to about 0° C., was added dropwise while the reaction mixture was stirred by passing therethrough a slow stream of nitrogen. After one hour the cooling bath was removed while stirring was continued for three hours, allowing the reaction mixture to warm up to 30° C. An amount of 5.0 ml. of ice-cold water was added then and the mixture was kept for one half an hour in an ice bath. The formed crystals were filtered, washed with 5.0 ml. of ice-cold water and dried on the filter by air. Yield: 45 milligrams (76 percent). White needles, melting point: 89° C.

Calculated for $C_2N_{14}$: C, 10.90; N, 89.10. Found: C, 10.50; 11.82; N, 88.87, 89.01.

*Example II*

Isocyanogen tetrabromide (0.1 gram) was reacted with sodium azide (0.09 gram) as described in Example I. Instead of acetone, 1.0 milliliter of absolute ethanol was used as solvent for the tetrabromide. The yield was 48 milligrams (81 percent) of isocyanogen tetraazide, melting point 89° C.

Isocyanogen tetraazide in solution can be controllably decomposed. For example, a solution of up to about 20% isocyanogen tetraazide, in kerosene, decaline or xylene can be safely heated to temperatures of 100° to 200° C. and under these conditions about 60% of the total nitrogen available is evolved. The resulting solution contains free organic radicals of high energy content and can be employed to catalyze radical induced polymerization processes, such as the polymerization of vinyl chloride, vinylidene chloride, 2-chlorobutadiene, butadiene, isoprene, styrene, or acrylonitrile.

Isocyanogen tetraazide, since it is sensitive to percussion, can be used as an initiator or detonator for high explosives, for example in percussion or blasting caps, in the same manner that lead azide and silver azide are conventionally employed.

We claim:
1. A method for the preparation of isocyanogen tetraazide which comprises reacting isocyanogen tetrabromide with an alkali metal azide in a mutual solvent for the reactants.
2. The method of claim 1 wherein the reaction is carried out at a temperature within the range of about 0° to 50° C. while the isocyanogen tetrabromide is dissolved in a small amount of an organic solvent miscible with water and the alkali metal azide is dissolved in a small amount of water.
3. As a new compound,

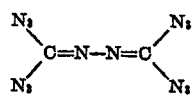

No references cited.